(12) United States Patent
Yopp et al.

(10) Patent No.: US 7,480,570 B2
(45) Date of Patent: Jan. 20, 2009

(54) FEATURE TARGET SELECTION FOR COUNTERMEASURE PERFORMANCE WITHIN A VEHICLE

(75) Inventors: Wilford Trent Yopp, Canton, MI (US); Anthony Gerald King, Ann Arbor, MI (US); Corinne Mentell, Louisville, KY (US); Yusheng Li, Troy, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 790 days.

(21) Appl. No.: 10/711,987

(22) Filed: Oct. 18, 2004

(65) Prior Publication Data

US 2008/0319670 A1    Dec. 25, 2008

(51) Int. Cl.
*G08G 1/16* (2006.01)
(52) U.S. Cl. .................. 701/301; 340/435; 340/903; 342/455
(58) Field of Classification Search .......... 701/29, 701/36, 300–302; 342/29, 41, 61, 69–70, 342/455; 340/425.5, 435–436, 903, 901
See application file for complete search history.

(56) References Cited

U.S. PATENT DOCUMENTS

| | | | |
|---|---|---|---|
| 5,068,664 A * | 11/1991 | Appriou et al. .............. 342/90 |
| 5,390,125 A * | 2/1995 | Sennott et al. .............. 701/214 |
| 5,465,079 A * | 11/1995 | Bouchard et al. ........... 340/576 |
| 5,600,553 A | 2/1997 | Kawasaki et al. | |
| 6,104,336 A * | 8/2000 | Curran et al. ................ 342/70 |
| 6,553,130 B1 | 4/2003 | Lemelson | |
| 6,748,312 B2 | 6/2004 | Russell et al. | |
| 6,794,987 B2 * | 9/2004 | Schiffmann et al. ......... 340/435 |
| 6,988,026 B2 * | 1/2006 | Breed et al. ................. 701/29 |
| 2001/0045981 A1 | 11/2001 | Gloger et al. | |
| 2003/0060956 A1 | 3/2003 | Rao et al. | |
| 2003/0149530 A1* | 8/2003 | Stopczynski ............... 701/301 |
| 2004/0001019 A1 | 1/2004 | Nakazawa et al. | |

* cited by examiner

*Primary Examiner*—Yonel Beaulieu
(74) *Attorney, Agent, or Firm*—Frank MacKenzie

(57) ABSTRACT

A target selection system (21) for a vehicle (12) includes an object detection sensor (17) that generates object detection signals associated with multiple detected objects. A feature target selection module (30) selects secondary targets from the objects and associates the secondary targets with respective features (23). A primary target selection module (31) selects primary targets from the secondary targets and associates each of the primary targets with a single respective concentrated feature.

20 Claims, 3 Drawing Sheets

FEATURE TARGET SELECTION FOR COUNTERMEASURE PERFORMANCE WITHIN A VEHICLE

RELATED APPLICATION

The present invention is related to U.S. patent application Ser. No. 10/711,985, entitled "Path Estimation and Confidence Level Determination System for a Vehicle," which is incorporated herein by reference.

TECHNICAL FIELD

The present invention generally relates to vehicle collision warning and countermeasure systems. The present invention more particularly relates to a system and method of selecting and tracking targets for various vehicle feature systems.

BACKGROUND OF THE INVENTION

Various sensing systems currently exist for performing collision warning and countermeasure system operations, such as detection, classification, tracking, and relative distance and velocity estimation of objects within close proximity of a host vehicle. Sensing systems also exist for performing other sensing system operations, such as windshield wiper and defogger operations, occupant sensing, classification, and tracking operations, and adaptive cruise control operations.

Collision warning and countermeasure system operations include providing a vehicle operator knowledge and awareness of vehicles and objects that are within close proximity of the host vehicle to prevent colliding with those objects. Countermeasure systems exist in various passive and active forms. Some countermeasure systems are used to aid in the prevention of a collision, others are used to aid in the prevention of an injury to a vehicle occupant.

Certain collision warning and countermeasure systems are able to detect, identify, and classify an object within close proximity of the host vehicle and warn the host vehicle operator, such that the operator can take precautionary steps to prevent a collision or injury. Other collision warning and countermeasure systems activate passive or active countermeasures such as airbags, load limiting seatbelts, or brake control whereby the system itself aids in the prevention of a collision or an injury.

Countermeasure systems may also be able to detect occupant characteristics and to determine which safety system countermeasures to perform and the times and rates of the countermeasures in response to those characteristics. Example restraint countermeasures that may be enabled are seat belt pretensioners and airbags. Occupant characteristics may include occupant positions within a seat, occupant size and weight, or other known occupant characteristics.

Some countermeasure systems incorporate external sensors for the detection of road and lane markings information, which can be used for vehicle position determination and future path prediction. The path prediction information may be utilized to perform countermeasures.

External sensors for object detection are used to identify and classify objects. The resulting object data is used to determine primary targets of interest for vehicle features, such as adaptive cruise control, forward collision warning, collision mitigation by braking, and pedestrian protection. Each vehicle feature has a unique set of target selection requirements. The computational demand of sequentially processing each of the detected objects against each of the target selection requirements results in a need for a high-powered processor. High-powered processors are expensive and are thus infeasible for automotive applications.

Thus, in an effort to improve countermeasure system performance there exists a need for an improved method of selecting and processing targets. In addition, there is a need to improve the accuracy of countermeasure system path prediction and to have knowledge as to the extent of that accuracy for improved countermeasure activation, determination, and operation.

SUMMARY OF THE INVENTION

The present invention provides a target selection system for a vehicle that includes an object detection sensor. The object detection sensor generates object detection signals associated with multiple detected objects. A feature target selection module selects secondary targets from the objects and associates the secondary targets with respective features. A primary target selection module selects primary targets from the secondary targets and associates each of the primary targets with a single respective concentrated feature.

The embodiments of the present invention provide several advantages. One advantage provided by an embodiment of the present invention is the provision of a countermeasure system that determines primary targets tailored for each associated feature, which improves target evaluation and threat assessment and ultimately aids in improving countermeasure deployment.

Another advantage provided by an embodiment of the present invention is the provision of a countermeasure system that focuses sensor performance on selected primary targets, which also improves target evaluation and threat assessment.

Yet another advantage provided by an embodiment of the present invention is the provision of a target selection system that selects secondary targets in response to an estimated future path of a vehicle along with an associated confidence level, in that estimation. In determining a confidence level, the system determines the accuracy of that estimation and is thus better capable of selecting targets, determining whether to perform a countermeasure or other safety system task, and determining the manner in which that countermeasure or safety system task is to be performed.

The present invention itself, together with attendant advantages, is best understood by reference to the following detailed description, when taken in conjunction with the accompanying drawing figures.

BRIEF DESCRIPTION OF THE DRAWINGS

For a more complete understanding of the invention, reference should be made to the embodiments illustrated in greater detail in the accompanying drawing figures, and also described below by way of examples of the invention, wherein.

DETAILED DESCRIPTION

Figure 1:
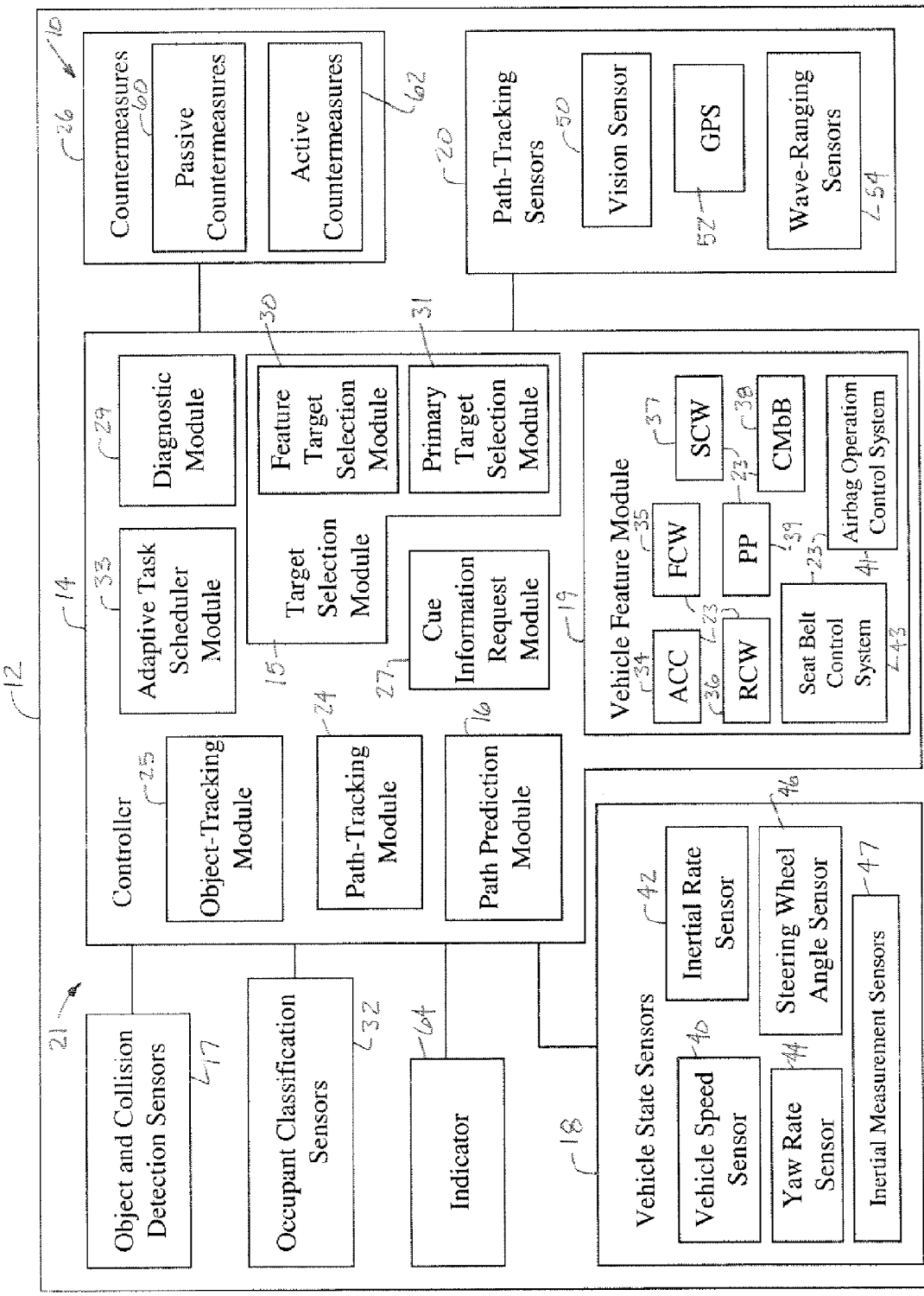
FIG. 1 is a block diagrammatic view of a collision warning, severity, and countermeasure system for a vehicle in accordance with an embodiment of the present invention.

While the present invention is described with respect to a system and method of selecting and tracking targets for various vehicle feature systems, the present invention may be adapted to be used in various applications and systems including: collision warning systems, collision avoidance systems, parking-aid systems, reversing-aid systems, passive countermeasure systems, adaptive cruise control systems, lane departure systems, lane-keeping systems, windshield clearing systems, airbag control systems, belt retractor control systems, or other systems known in the art. The present invention may be used to supplement a pre-collision sensing system.

In the following description, various operating parameters and components are described for multiple constructed embodiments. These specific parameters and components are included as examples and are not meant to be limiting.

Additionally, in the following description, the term "performing" may include activating, deploying, initiating, powering, and other terms known in the art that may describe the manner in which a countermeasure or a comfort and convenience attribute may be operated.

As well, in the following description, various countermeasures are discussed. The countermeasures may be reversible or irreversible. Reversible countermeasures refer to countermeasures that may be reset to their original form or used repeatedly without a significant amount of functional deficiency, which may be determined by a system designer. These include brakes, lights, audible alerts, visible alerts, displays, throttle, steering, reversible belt retractors, etc. Irreversible countermeasures refer to countermeasures such as airbags that, once deployed, are not reusable.

Furthermore, a countermeasure signal may include information pertaining to the above-stated reversible and irreversible countermeasures or may include other information, such as collision warning information, and parking-aid or reversing-aid countermeasure information. For example, the countermeasure signal may contain object detection information, which may be used to indicate to a vehicle operator the presence or close proximity of a detected object.

In addition, the term "object" may refer to any animate or inanimate object. An object may be a vehicle, a pedestrian, a lane marker, a road sign, a roadway lane designating line, a vehicle occupant, window moisture, or other object known in the art.

Moreover, the term "feature" refers to any monitoring system, pre-collision system, countermeasure control system, collision detection system, collision mitigation system, occupant or pedestrian protection system, or other related system known in the art. Some example features are an adaptive cruise control system, a forward collision warning system, a rearward collision warning system, a side collision warning system, a collision mitigation by braking system, an airbag system, a seatbelt control system, and a pedestrian protection system. Features can be both related to comfort and convenience of the driver and passengers or related to their safety. Features often command the operation of one or more countermeasures sequentially or simultaneously.

Referring now to FIG. 1, a block diagrammatic view of a collision warning, severity, and countermeasure system 10 for a vehicle 12 in accordance with an embodiment of the present invention is shown. The countermeasure system 10 includes a controller 14 with a target selection module 15 and a path prediction module 16, object and collision detection sensors 17, vehicle state sensors 18, and path-tracking sensors 20. The controller 14, the target selection module 15, and the object detection sensors 17 are part of a target selection system 21. The target selection system 21 selects primary targets of interest and adjusts parameters of the object detection sensors 17 for improved monitoring and tracking thereof as appropriate for vehicle features 23. The path prediction module 16 estimates the future path of the vehicle 12 in response to data received from the vehicle state sensors 18 and the path-tracking sensors 20.

The controller 14 includes the target selection module 15, the object-tracking module 25, and the diagnostics module 29. The target selection module 15 selects secondary targets associated with the features 23 via a feature target selection module 30. The target selection module 15 also determines which secondary targets are primary targets for the features 23 and generates a primary target data signal for use by the features 23 via a primary target selection module 31. The object-tracking module 25 detects and tracks objects within proximity of the vehicle 12. The diagnostics module 29 determines the diagnostics of the object detection sensors 17, the occupant classification sensors 32, as well as hardware and software faults related to each module. The vehicle features 23 may include an adaptive cruise control (ACC) system 34, a forward collision warning (FCW) system 35, a rearward collision warning (RCW) system 36, a side collision warning (SCW) system 37, a collision mitigation by braking (CMbB) system 38, a pedestrian protection (PP) system 39, an airbag operation system 41, a seatbelt control system 43, as well as other features known in the art.

The controller 14 also includes the path prediction module 16, the vehicle feature module 19, the path-tracking module 24, the cue information request module 27, and the adaptive task scheduler module 33. The path prediction module 16 estimates a driver intended path or future path of the vehicle 12 along with a confidence level in that estimation. The path-tracking module 16 is used to estimate and determine the future lane or road of travel of the vehicle 12 and generates a predicted future path signal, as well as an associated confidence level, which are described in greater detail below. The path-tracking module 16 is used in the tracking of objects and the storing, manipulating, and evaluating of any related information thereof.

The vehicle features module 19 determines which countermeasures to activate and generates a countermeasure command signal in response to the selected target signal from the target selection module 15. One or more countermeasure command signals may be generated based on the number of features that receive a selected target signal. The countermeasure command signals are used by the countermeasures 60 to activate various countermeasures.

The cue information request module 27 is used to acquire additional and specific information related to detected objects. The task scheduler 33 determines image-processing tasks to perform in a current update cycle. Task signals are generated and any remaining tasks not performed in the current update cycle are compiled for the next or upcoming update cycle. The modules 15, 16, 19, 24, 25, 27, 29, and 33 may be software or hardware based.

The controller 14 may perform various different countermeasure and comfort and convenience feature operations including countermeasure control, adaptive cruise control, lane-keeping control, lane-departure control, window clearing control, collision avoidance control, airbag control, seat belt control, or other sensing system operations known in the art. The controller 14 may also perform the countermeasures related to these features. The operations may be performed sequentially or simultaneously.

The controller 14 through the use of the task scheduler 33 determines which of the sensing system operations to perform. The controller 14 while performing one or more of the sensing system operations may determine whether to perform one or more of the countermeasures 26 and indicate to the vehicle operator various object and vehicle status information. Depending upon relative positions, velocities, and accelerations of the detected objects, the controller 14 may also determine whether to indicate to the vehicle operator of a potential collision or may perform a countermeasure, as needed. Countermeasures are performed to prevent a collision, mitigate a potential injury, and prevent the vehicle 12 from traveling outside a current lane of travel. The controller 14 may be microprocessor based such as a computer having a central processing unit, memory (RAM and/or ROM), and associated input and output buses. The controller 14 may be an application-specific integrated circuit or be formed of other logic devices known in the art. The controller 14 may be a portion of a central vehicle main control unit, an interactive vehicle dynamics module, a restraints control module, a main safety controller, or may be a stand-alone controller as shown.

The vehicle state sensors 18 generate vehicle state signals that correspond to the current state of the vehicle 12. The vehicle state sensors 18 may include a vehicle speed sensor 40, an inertial rate sensor 42, a yaw rate sensor 44, a steering wheel angle sensor 46, inertial measurement sensors 47, or various other vehicle state sensors known in the art. The inertial rate sensor 42 may include rotational sensors located on and indicative of a characteristic of an engine, a transmission, an axle, a wheel, or other component or device of the vehicle 12. The inertial measurement sensors 47 may include linear accelerometers, linear velometers, and angle rate sensors. The vehicle state sensors 18 may be part of a vehicle component or device or may be standalone sensors.

The path-tracking sensors 20 are used to detect and track lanes, roads, and markings thereon. The path-tracking sensors 20 may include vision sensors 50, such as cameras, or may be in some other form known in the art. The path-tracking sensors 20 may include a global position system 52 and provide road curvature, speed limits, and other information that may indicate a future vehicle path. Scene-tracking is performed by wave-ranging sensors 54, which detect objects, such as guardrails or series of parked cars along the edge of a roadway.

The object detection sensors 17 monitor an environment exterior to the vehicle 12 and generate object detection signals upon detection of an object and collision detection signals upon the detection of a collision. The occupant classification sensors 32 monitor interior areas of the vehicle 12 and generate occupant classification signals in response to the presence and characteristics of occupants therein. The occupant characteristics may include occupant positioning within a seat, occupant size, shape, weight, or other known occupant characteristics.

The object detection sensors 17 and the occupant classification sensors 32 may be infrared, visible, ultrasonic, radar, active electro-magnetic wave-ranging, or lidar based or may be in the form of an accelerometer, a piezo electric sensor, a piezo resistive sensor, a charged-coupled device, a series of photodiodes, or in some other form known in the art. Wave-ranging devices may include radar, lidar, stereo camera pairs, 3-D imagers, with active infrared illumination, or other wave-ranging devices known in the art. Vision sensors may refer to robotic cameras or other visual imaging cameras. The wave-ranging sensors and the vision sensors may be monocular or binocular and may be used to obtain height, width, depth, range, range rate, angle, and any other visual aspect information. Monocular cameras may be used to obtain less accurate and less reliable range and range rate data as compared to binocular cameras. The object detection sensors 17 and the occupant classification sensors 32 may also be in the form of a pressure sensor or a strain gage. The object detection sensors 17 and the occupant classification sensors 32 may be in various locations on the vehicle and any number of each may be utilized.

Range is defined as distance between a host vehicle and an object. Range rate is defined as the change in distance per unit change in time of an object relative to a host vehicle. Angle is defined as the angular displacement of an object relative to a centerline of a host vehicle.

In one embodiment of the present invention, cameras are used for object height, width, angle, and visual aspect information and wave-ranging devices are used for range, range rate, and angle information. The cameras generate a first object detection signal and the wave-ranging devices generate a second object detection signal having the above-stated information. Visual cues and aspects may be obtainable from both the first object detection signal and the second object detection signal.

The controller 14 may enable the various safety and comfort and convenience vehicle features 23 in response to object detection signals and path estimations. The controller 14 as part of performing a vehicle feature may generate a countermeasure activation signal.

The controller 14 may enable various countermeasures 26 including passive countermeasures 60 and active countermeasures 62 in response to the countermeasure signal from one or more vehicle features. The controller 14 as part of a countermeasure may generate a warning signal and communicate the warning signal to vehicle occupants via the indicator 64.

The passive countermeasures 60 may include internal air bag control, seatbelt control, knee bolster control, head restraint control, load limiting pedal control, load limiting steering control, pretensioner control, external air bag control, pedestrian protection control, and other passive countermeasures known in the art. Air bag control may include control over front, side, curtain, hood, dash, or other type of airbags known in the art. Pedestrian protection may include a deployable vehicle hood, a bumper system, or other pedestrian protective devices.

The active countermeasures 62 may include brake control, throttle control, steering control, suspension control, transmission control, and other vehicle control systems. The controller 14 may signal the vehicle operator via the indicator 64 of an impending potential collision so that the vehicle operator may actively perform a precautionary action, such as applying the brakes or steering to prevent a collision.

The indicator 64 is used to signal or indicate a safety system signal, which may include a calibration signal, an occupant classification sensor related signal, a warning signal, a collision-warning signal, a countermeasure signal, or an object identification signal in response to the object detection signals. The indicator 64 may include a video system, an audio system, an LED, a light, a global positioning system, a heads-up display, a headlight, a taillight, a display system, a telematic system, or other indicator known in the art. The indicator 64 may supply warning signals, collision-related information, lane departure and lane-keeping information, external-warning signals to objects or pedestrians located outside of the vehicle 12, or other pre and post collision information.

Figure 2:
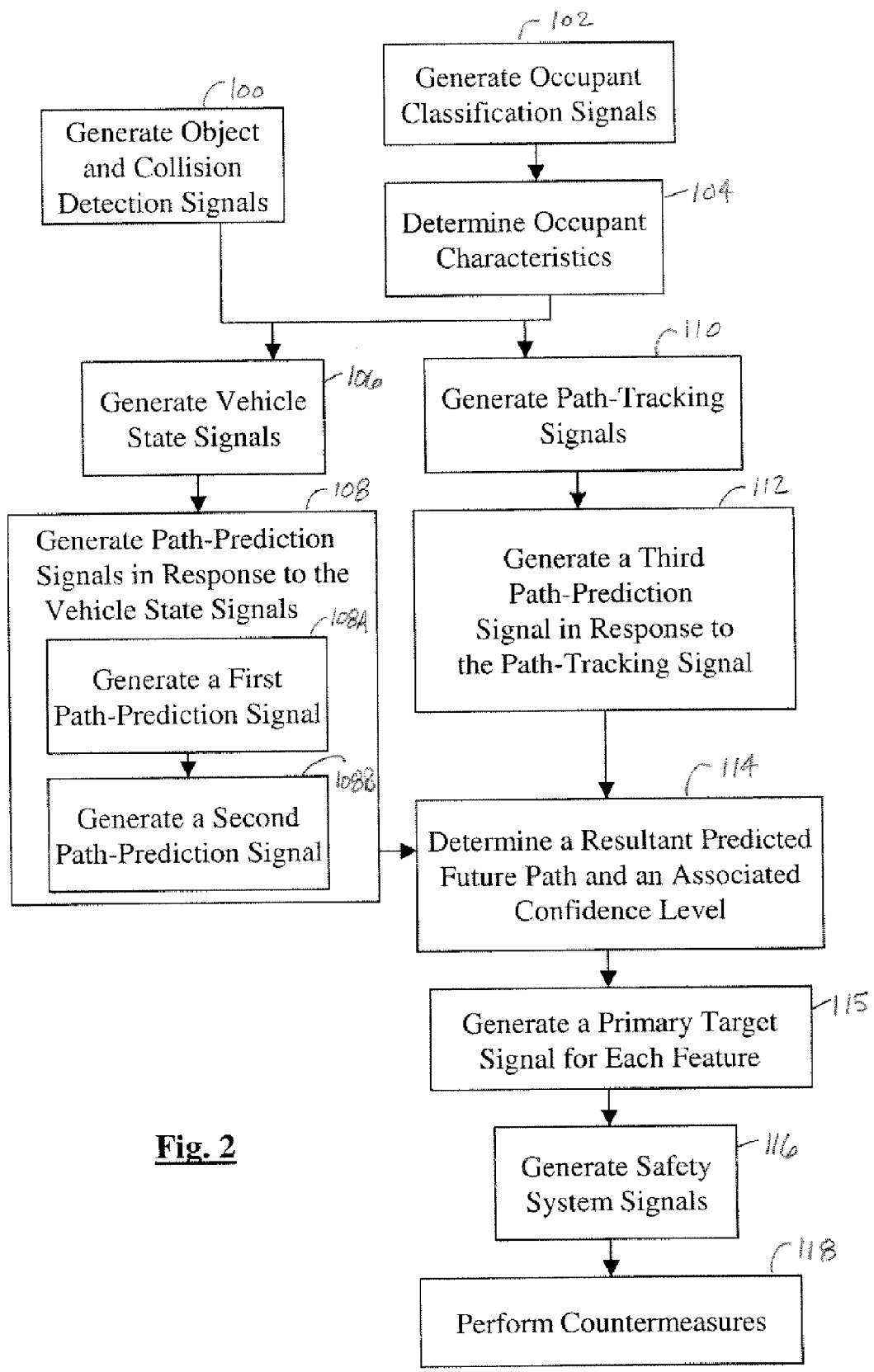
FIG. 2 is a logic flow diagram illustrating a method of performing a countermeasure within a vehicle in accordance with an embodiment of the present invention.

Referring now to FIG. 2, a method of performing countermeasures within the vehicle 12 in accordance with an embodiment of the present invention is shown.

In step 100, the object detection sensors 17 generate multiple object detection signals corresponding to the detection of objects within areas external to the vehicle 12. In one embodiment of the present invention, one or more cameras are used to determine height, width, angle, and visual aspect information and wave-ranging devices are use to determine the range, range rate, and angle information of an object. The wave-ranging devices 54 generate a first object detection signal upon detecting a target object in the sensor field-of-view. The first object detection signal contains range, range rate, and angle information of the target object. Target object information, such as visual cues and features, is also obtainable from the first object detection signal. The cameras generate a second object detection signal for the same target object, which contains object height, width, and angle information. Target object information, such as visual cues and features is also obtainable from the second object detection signal.

In step 102, the occupant classification sensors 32 generate occupant classification signals.

In step 104, the controller 14 determines occupant characteristics, such as size, weight, height, and seat position, in response to the occupant classification signals. In determining occupant characteristics the controller 14 may also determine whether a child safety seat is located within a vehicle seat or whether a vehicle seat belt is being utilized.

In step 106, the vehicle state sensors 18, as commanded by the adaptive task scheduler 33, generate vehicle state signals including a current vehicle speed, a current steering wheel angle, a current yaw rate, and a current lateral acceleration of the vehicle 12.

In step 108, the path prediction module 16, as commanded by the adaptive task scheduler 33, generates multiple predicted path estimations in the form of path prediction signals in response to the vehicle state signals. In step 108A, the path prediction module 16 generates a first path prediction signal in response to the current steering wheel angle and the current vehicle speed. The steering wheel angle provides information related to the driver intended direction of travel and to the degree of turning radius of the vehicle 12. A predicted path may be determined in response to the change in steering wheel angle position and host vehicle speed. In step 108B, the path prediction module 16 generates a second path prediction signal in response to the current vehicle speed, the current yaw rate, and the lateral acceleration. The yaw rate provides instantaneous radius of curvature of a vehicle path. The yaw rate may be determined using yaw rate information gathered from an adaptive cruise control system, such as system or feature 34.

In step 110, the path-tracking sensors 20, as commanded by the adaptive task scheduler 33, generate path-tracking signals indicative of the current path of the vehicle 12. The path-tracking signals provide information related to the roadway. In step 112, the path-tracking module 24, as commanded by the adaptive task scheduler 33, generates a third predicted path estimation or path prediction signal in response to the path-tracking signals. Through the use of steering wheel angle information, yaw rate information, path-tracking information, and other related information lane change information and prediction can be accurately determined.

In steps 108 and 110, any number of path prediction signals may be generated and each path prediction signal may be generated in response to one or more vehicle sensors including the vehicle state sensors 18 and the path-tracking sensors 20.

In step 114, the path prediction module 16 determines a resultant predicted future path and an associated confidence level. The resultant path is determined in response to the preliminary path prediction signals or the first path prediction signal or the second path prediction signal, and the third path prediction signal. The preliminary path prediction signals are compared to generate the resultant path and to determine the confidence level or accuracy of that resultant path. When the preliminary path prediction signals are in agreement, or in other words, are approximately the same a high confidence level is assigned. The confidence level is contrived through the convolution of the various preliminary path prediction signals via a filter or other comparator method that is known in the state of the art. In one embodiment, when the preliminary path prediction signals are not in agreement then one of the preliminary prediction signals is selected. When one of the path prediction signals are selected a pre-determined criteria may be utilized. In another embodiment, when the preliminary path prediction signals are not in agreement then an average or center approximation between the preliminary path prediction signals is determined. An average, a median, a center point, a mean, an extrapolation, or other functional result may be utilized as the resultant path. Target selection refers to the convolution of a target monitored over time and the projected path of the vehicles.

In step 115, the controller 14 generates a primary target signal for each feature in response to the object detection signals and predicted future path signal and predicted future path confidence level. Any target selection method known in the art may be performed in response to the object detection signals and the selected or resultant path. The target selection is based on selection rules that may be specific for each feature, and selects the target that is or are the most of concern and of interest to that feature. One such selection rule, for example may be for a feature to select its primary target for which it deems to be of highest threat, which may be the closest in-path target. Each feature may require its own independent definitions and prioritizations of its primary list of targets, which will be used to perform the target selection for that feature.

In step 116, the controller 14 generates multiple countermeasures signals in response to the multiple primary target signals and the occupant classification signals. The countermeasures signals may include not only countermeasures related signals, as stated above, but may also include signals related to other sensing system controls.

In step 118, the controller 14 may perform multiple sensing system operations in response to the countermeasure signals. The controller 14 may perform a countermeasure operation, a windshield clearing operation, an adaptive cruise control operation, or any of the other above-mentioned or known in the art sensing system operation in response to the safety system signals.

Figure 3:
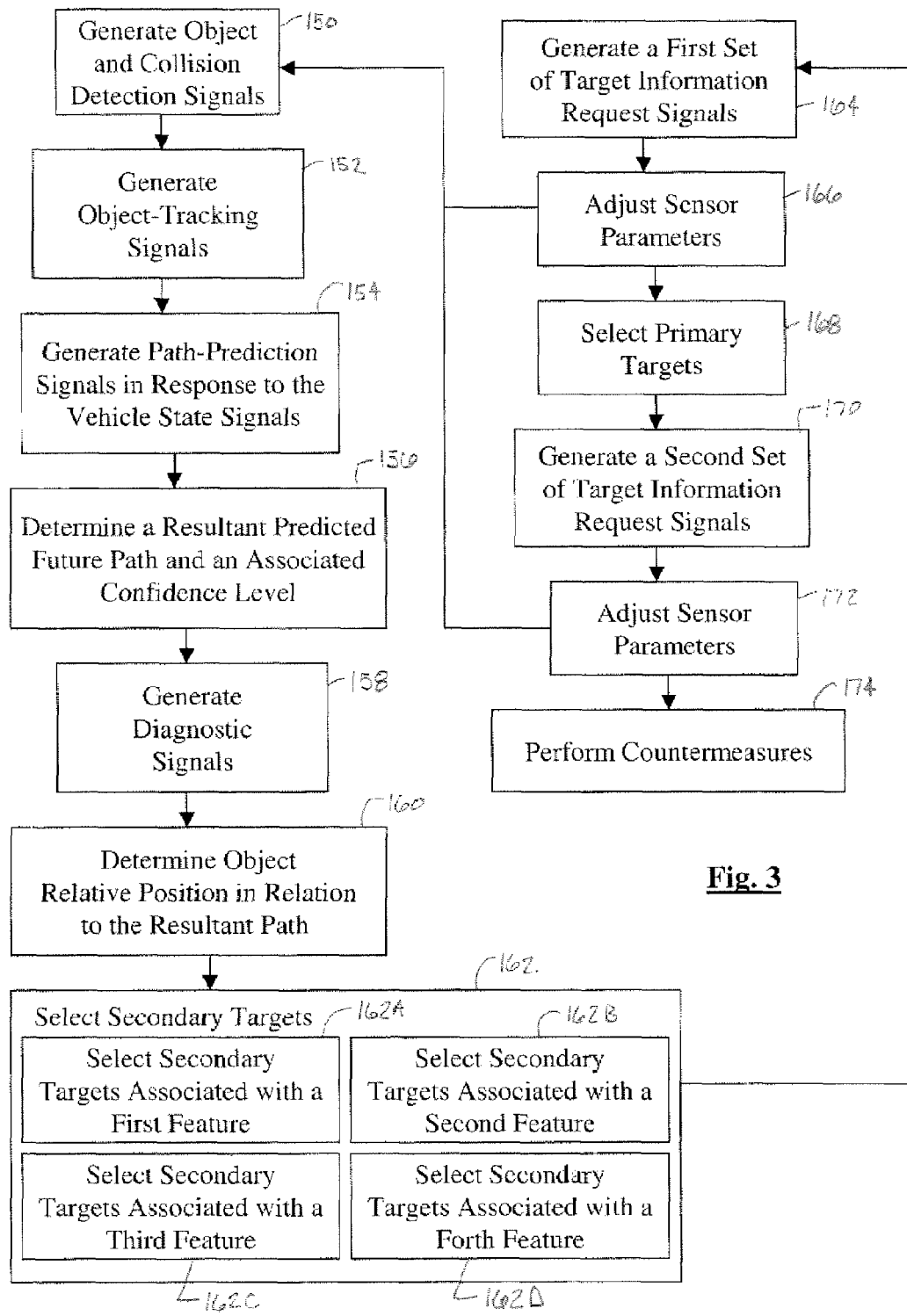
FIG. 3 is a logic flow diagram illustrating a method of selecting targets and performing countermeasures within a countermeasure system of a vehicle in accordance with an embodiment of the present invention.

Referring now to FIG. 3, a method of selecting targets and performing countermeasures within the countermeasure system 10 in accordance with an embodiment of the present invention is shown.

In step 150, the object detection sensors 17 generate object detection signals.

In step 152, the object-tracking module 25 tags newly detected objects as new and tracks previously detected objects. The object-tracking module 25 determines which objects are new and which objects can be correlated to previously tracked objects in response to the object detection signals. The previously detecting objects and the newly detected objects may be tracked using a predetermined set of rules or criteria. The object-tracking module 25 generates an object tracker signal, which contains an object list, object data, such as range, range-rate, angle, as well as classification, certainty indices, and confidence levels.

In step 154, the path prediction module 16 generates multiple predicted path estimations in the form of path prediction signals, as described above with respect to the method of FIG. 2.

In step 156, the path prediction module 16 generates a resultant predicted future path and the associated confidence level in response to the path prediction signals, also as described above with respect to the method of FIG. 2.

In step 158, the diagnostic module 29 generates diagnostic signals associated with the sensors 17 and 32. For example, the diagnostic module 29 may provide information in regards to whether a particular sensor is functioning and/or functioning properly. The diagnostic module 29 may determine that an electrical spike has occurred and to discard the data generated or received during a particular associated time frame.

In step 160, the controller 14 in response to the object list and associated data, the resultant predicted future path and the associated confidence level, and the diagnostic signals determines the relative positions of the targets relative to the predicted path and generates an object relative path signal. The dynamics of each object are compared to the predicted path of the host vehicle 12 to determine the relative location of that object. Identified object locations may be utilized to cue the sensors 17 and 32 to, for example, further focus interrogation of particular secondary and/or primary targets in subsequent video frames.

In step 162, the feature target selection module 30 selects secondary targets from the detected objects in response to the object tracker signal and the object relative path signal and associates the secondary targets with the respective features. The secondary targets are selected in response to the resultant predicted future path and the associated confidence level, as well as in response to the object data relative to the vehicle 12.

Steps 162A-D are an illustrative example of performing step 162 for four features, although step 162 may be performed for any number of features. In step 162A, the feature target selection module 30 selects secondary targets associated with a first feature. In step 162B, the feature target selection module 30 selects secondary targets associated with a second feature. In step 162C, the feature target selection module 30 selects secondary targets associated with a third feature. In step 162D, the feature target selection module 30 selects secondary targets associated with a forth feature. Steps 162A-D are performed simultaneously. Simultaneous target selection for various features eliminates the need for high-powered processing.

In step 164, a cue information request module 27 generates a first set of target information request signals containing requests for additional information associated with the selected secondary targets in step 162.

In step 166, sensor parameters are adjusted in response to the first set of target information request signals such that upcoming object detection signals include additional information related to the selected secondary targets. In one embodiment, cameras are utilized and receive the information request signals. The cameras in response thereto adjust image settings to provide more detailed information about the object(s) of concern. Upon completion of step 166 the controller 14 may continue to step 168 and/or return to step 150.

In step 168, the primary target selection module 31 selects primary targets from the secondary targets and associates each of the primary targets with a single respective concentrated feature. A "concentrated feature" refers to a feature of focus in which tasks are performed in relation thereto instead of performing tasks in relation to other features. Thus, a single primary target is associated with a single feature and visa versa. Of course, certain features, such as the FCW feature 35, may have more than one associated primary target. The additional primary targets may be accounted for depending upon the processor utilized, but in general simplification to the tracking and processing of a single primary target simplifies system power requirements. Additional information received in association with the selected secondary targets is utilized in analyzing and evaluating the selected primary targets.

Primary targets are selected using criteria associated with each feature in response to object data. Object data may include dynamics, such as range, range-rate, range acceleration, angle, angle rate, as well as classifications, predicted object path, and diagnostic signals. Each feature provides definitions and prioritizations of the primary list of targets, which are used to perform the target selection for that feature.

For example, a first feature may require that a closest object relative to the vehicle 12 be tagged or referred to as the primary target, whereas a second feature may require that the closest object within the path of the vehicle 12 be referred to as the primary object. In some scenarios the closest object to the vehicle 12 and the closest object within the path of the vehicle may refer to the same object.

In step 170, the cue information request module 27 may generate a second set of target information request signals containing requests for additional information associated with the selected primary targets in step 168.

In step 172, sensor parameters are adjusted in response to the second set of target information request signals such that upcoming object detection signals include additional information related to the selected primary targets. Upon completion of step 172 the controller 14 may continue to step 174 and/or return to step 150. Cueing the sensors and receiving updated and more reliable target information improves performance of the features.

In step 174, the controller 14 may determine collision severity, object threat, as well as other feature information known in the art in response to the selected and tracked primary targets and perform countermeasures in response thereto.

The above-described steps in the methods of FIGS. 2 and 3 are meant to be illustrative examples; the steps may be performed sequentially, synchronously, simultaneously, or in a different order depending upon the application.

The present invention provides a method of performing target selection for improved feature and countermeasure performance and in so doing requiring less processing power and time.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A target selection system for a vehicle, said target selection system comprising:
   at least one object detection sensor for generating object detection signals associated with a plurality of objects;
   a feature target selection module for selecting secondary targets from said plurality of objects and associating said secondary targets with a plurality of respective features; and
   a primary target selection module for selecting primary targets from said secondary targets and associating each of said primary targets with a single respective concentrated feature.

2. A target selection system as in claim 1, wherein said single respective concentrated feature is selected from said plurality of respective features.

3. A target selection system as in claim 1, said target selection system further comprising:
a path prediction module for determining at least one predicted path estimation of said vehicle; and
a diagnostic module for determining positions of said plurality of objects in response to said at least one predicted path estimation;
wherein said feature target selection module is operable to select said secondary targets in response to the determined positions.

4. A target selection system as in claim 3, wherein said path prediction module is operable to determine a resultant predicted future path and an associated path confidence level in response to said at least one predicted path estimation and said diagnostic module, and said diagnostic module is operable to determine said positions in response to said predicted future path and said confidence level.

5. A target selection system as in claim 1, said target selection system further comprising:
an object tracker module for tracking said plurality of objects and generating an object data field;
wherein said feature target selection module is operable to select said secondary targets in response to said object data field.

6. A target selection system as in claim 5, wherein said object tracker module is operable tag at least one of said plurality of objects as new and track previously detected objects.

7. A target selection system as in claim 5, wherein said object data field includes:
an object list; and
object associated characteristic data.

8. A target selection system as in claim 7, wherein said object associated characteristic data includes at least one type of data selected from the list consisting of range data, range-rate data, angle data, position data, shape data, size data, weight data, classification data, certainty indices, and confidence levels.

9. A target selection system as in claim 1, said target selection system further comprising:
a cue information request module for generating target information request signals;
wherein said at least one object detection sensor is operable to generate said object detection signals in response to said target information request signals.

10. A target selection system as in claim 9, wherein said cue information request module is operable to generate a first information request signal associated with a first primary target and also a second information request signal associated with a second primary target.

11. A target selection system as in claim 9, wherein said at least one object detection sensor is operable to adjust sensor settings in response to said target information request signals.

12. A target selection system as in claim 9, wherein said cue information request module is operable to generate a first information request signal associated with a first secondary target and also a second information request signal associated with a second secondary target.

13. A target selection system as in claim 1, wherein said feature target selection module is operable to select a first set of secondary targets associated with a first feature and also a second set of secondary targets associated with a second feature.

14. A target selection system as in claim 1, wherein said primary target selection module is operable to select a first primary target associated solely with a first feature and also a secondary target associated solely with a second feature.

15. A target selection system as in claim 1, wherein said primary target selection module is operable to select a set of primary targets associated with a particular feature.

16. A countermeasure system for a vehicle, said countermeasure system comprising:
at least one object detection sensor for generating object detection signals associated with a plurality of objects;
a feature target selection module for selecting secondary targets from said plurality of objects and associating said secondary targets with a plurality of respective features;
a primary target selection module for selecting primary targets from said secondary targets and associating each of said primary targets with a single respective concentrated feature; and
a controller for performing at least one countermeasure in response to said primary targets.

17. A countermeasure system as in claim 16, said countermeasure system further comprising:
a path prediction module for determining a resultant predicted future path of said vehicle and an associated path confidence level; and
a diagnostic module for determining positions of said plurality of objects in response to said resultant predicted future path and said path confidence level;
wherein said feature target selection module is operable to select said secondary targets in response to the determined positions.

18. A target selection system for a vehicle, said target selection system comprising:
at least one object detection sensor for generating object detection signals associated with a plurality of objects;
a plurality of vehicle state sensors for generating vehicle state signals;
a path-tracking module for generating a path-tracking signal;
a path prediction module for generating at least one path-prediction signal in response to said vehicle state signals, said path prediction module being operable to determine a resultant predicted future path of said vehicle and an associated path confidence level in response to said at least one path-prediction signal and said path-tracking signal; and
a controller for determining threat of each of said plurality of objects in response to said object detection signals and selecting at least one primary target for a plurality of features in response to said resultant predicted future path, said associated path confidence level, and said threat.

19. A target selection system as in claim 18, wherein:
said controller, for selecting said at least one primary target, is operable to determine a highest threat object of said plurality of objects for said plurality of features; and
said controller is operable to perform a countermeasure in response to said primary target.

20. A target selection system as in claim 18, wherein said controller comprises:
a feature target selection module for selecting secondary targets from said plurality of objects and associating said secondary targets with said plurality of features; and
a primary target selection module for selecting said at least one primary target from said secondary targets and associating each of a plurality of concentrated features with said at least one primary target.

* * * * *